(12) United States Patent
Meili

(10) Patent No.: US 11,435,569 B2
(45) Date of Patent: Sep. 6, 2022

(54) PROCESS SCOPE

(71) Applicant: MSE MEILI AG, Schaffhausen (CH)

(72) Inventor: Reto T. Meili, Schaffhausen (CH)

(73) Assignee: MSE MEILI AG, Schaffhausen (CH)

( * ) Notice: Subject to any disclaimer, the term of this patent is extended or adjusted under 35 U.S.C. 154(b) by 183 days.

(21) Appl. No.: 16/954,103

(22) PCT Filed: Dec. 13, 2018

(86) PCT No.: PCT/CH2018/000051
§ 371 (c)(1),
(2) Date: Jun. 15, 2020

(87) PCT Pub. No.: WO2019/113716
PCT Pub. Date: Jun. 20, 2019

(65) Prior Publication Data
US 2021/0181496 A1 Jun. 17, 2021

(30) Foreign Application Priority Data

Dec. 15, 2017 (CH) .................................... 01537/17

(51) Int. Cl.
*G02B 23/24* (2006.01)
*G02B 23/26* (2006.01)
(52) U.S. Cl.
CPC ..... *G02B 23/2469* (2013.01); *G02B 23/2423* (2013.01); *G02B 23/2484* (2013.01); *G02B 23/2492* (2013.01); *G02B 23/26* (2013.01)
(58) Field of Classification Search
CPC ............ G02B 23/2469; G02B 23/2423; G02B 23/2484; G02B 23/2492; G02B 23/24; G02B 23/26; H04N 2005/2255
See application file for complete search history.

(56) References Cited

U.S. PATENT DOCUMENTS

| 4,112,763 A | 9/1978 | Pirlet |
| 4,965,601 A | 10/1990 | Canty |

(Continued)

FOREIGN PATENT DOCUMENTS

| DE | 19828688 A1 | 7/1999 |
| DE | 102013020896 A1 | 2/2015 |

(Continued)

OTHER PUBLICATIONS

International Search Report Prepared by the European Patent Office for PCT/CH2018/000051, dated Aug. 5, 2019.

*Primary Examiner* — Rowina J Cattungal
(74) *Attorney, Agent, or Firm* — Brooks Kushman P.C.

(57) ABSTRACT

A process scope for monitoring, closed-loop and open-loop control of chemical and physical processes in the interior of explosion-proof containers and reactors during operation without interruption of the production and/or research processes. The device has an observation tube tip, an electro-optic or spectroscopic camera, a shock-proof housing with an electronic protection circuit, a lighting device, and image processing electronics. The tube tip does not have any ignition sources and is suitable for use in danger zones. Optical fibers are provided for transferring light from the lighting device to the tube tip and for the image transfer from the tube tip to the electro-optic or spectroscopic camera. A glass fiber data cable is provided for the transmission of image data from the camera to the data acquisition, system. By arranging the lighting and monitoring front windows laterally in the tube tip, parallax distance measurements can be made within the reaction vessel.

20 Claims, 8 Drawing Sheets

(56) References Cited

U.S. PATENT DOCUMENTS

Figure 1:
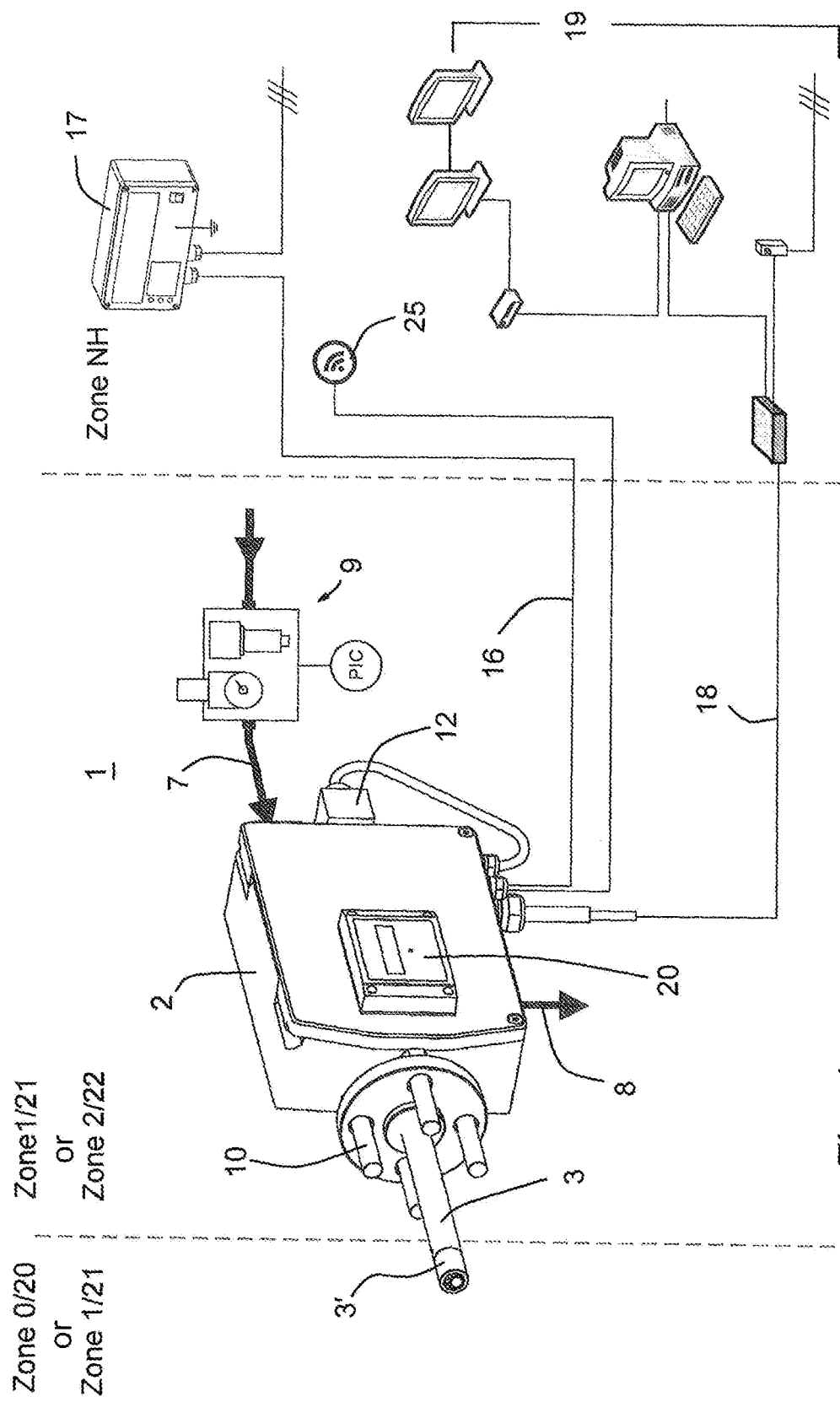

| | | | |
|---|---|---|---|
| 5,698,642 A | 12/1997 | Govoni et al. | |
| 6,227,842 B1 | 5/2001 | Lemelson et al. | |
| 6,570,647 B1 | 5/2003 | Meili | |
| 6,639,664 B2 | 10/2003 | Haan et al. | |
| 7,520,744 B2 | 4/2009 | Wintrich | |
| 8,194,380 B2 | 6/2012 | Murata et al. | |
| 9,258,535 B2* | 2/2016 | Pool | H04N 5/232411 |
| 9,883,089 B2* | 1/2018 | Urakawa | A61B 1/05 |
| 10,499,794 B2* | 12/2019 | Gilreath | A61B 1/051 |
| 10,533,901 B2* | 1/2020 | Wang | G01K 1/14 |
| 11,079,316 B2* | 8/2021 | Helbley | G01N 33/0004 |
| 2003/0002036 A1 | 1/2003 | Haan et al. | |
| 2006/0024628 A1 | 2/2006 | Wintrich | |
| 2007/0132842 A1* | 6/2007 | Morris | H04N 7/185 |
| | | | 348/82 |
| 2007/0177010 A1 | 8/2007 | Murata | |
| 2008/0228036 A1 | 9/2008 | Suzuki et al. | |
| 2008/0242927 A1 | 10/2008 | Hirata | |
| 2016/0216238 A1 | 7/2016 | Schubert | |
| 2017/0168287 A1 | 6/2017 | Lietzau | |

FOREIGN PATENT DOCUMENTS

| | | |
|---|---|---|
| DE | 102015015993 A1 | 6/2017 |
| EP | 0996865 B1 | 12/2004 |
| EP | 1621813 B1 | 3/2010 |
| FR | 2316564 A1 | 1/1977 |

\* cited by examiner

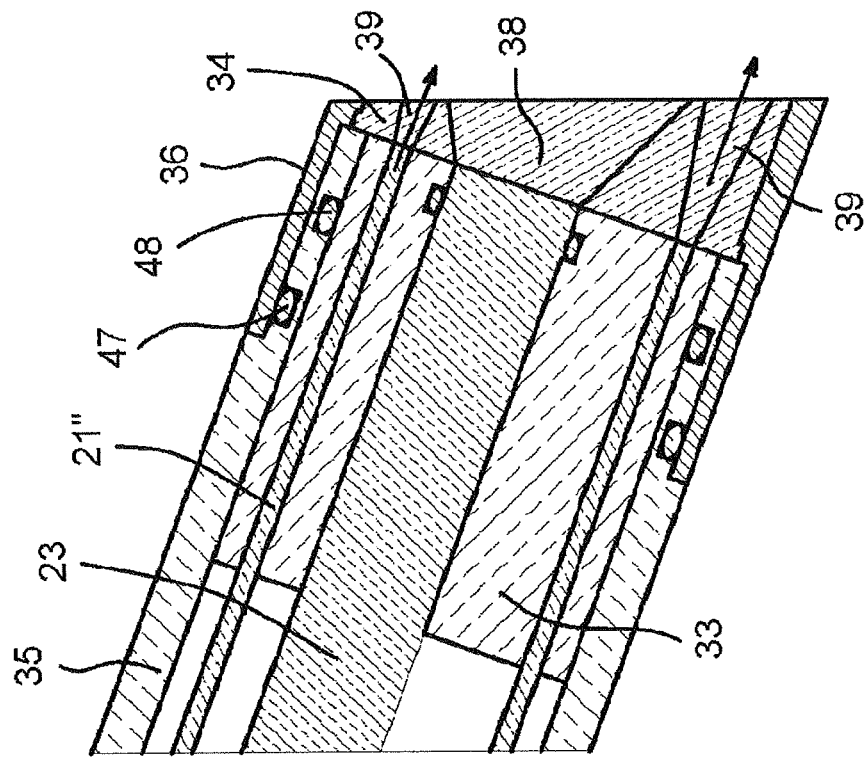
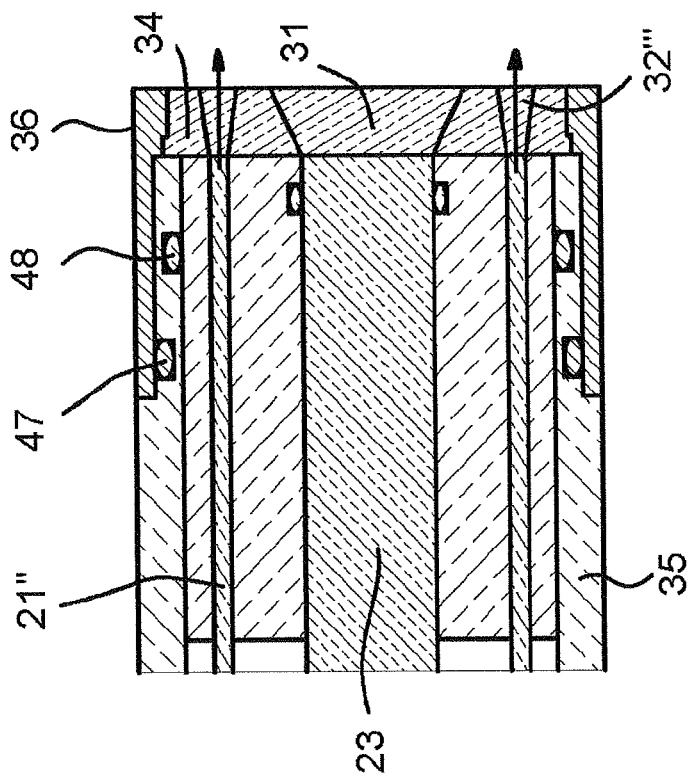
Fig. 8
Fig. 7

PROCESS SCOPE

CROSS-REFERENCE TO RELATED APPLICATION

This application is the U.S. national phase of PCT Application No. PCT/CH2018/000051 filed on Dec. 13, 2018, which claims priority to CH Patent Application No. 01537/17 filed on Dec. 15, 2017, the disclosures of which are incorporated in their entirety by reference herein.

The present invention relates to a device for observing, monitoring, controlling and regulating processes in the interiors of explosion-proof reaction containers according to the preamble of claim 1, and its use for in-line or in situ observation, monitoring, control and regulation of such processes.

Devices for monitoring production and/or research and development processes are used in particular in laboratories and/or in industrial production facilities, e.g. for petrochemical facilities, the chemical industry, pharmaceutical and/or food industry, as are known, e.g. from U.S. Pat. No. 4,965,601. The reactor vessels are provided with viewing windows for this that allow a direct optical observation of the material flow, in particular the reaction progress, with respect to the behavior and the state of the reaction materials. It is clear that these observation devices and their lens systems are exposed to extreme physical and chemical loads, and for this reason must be particularly robust. Unfortunately, these devices require relatively large observation windows incorporated in the respective containers, which unfortunately become worn, corroded, or form leaks, or even burst, when subjected to extreme loads, thus impacting the availability of the facilities.

For this reason, endoscopic, or videoscopic devices, such as those known from EP 0,996,865, with relatively small observation windows, are increasingly used. These endoscopic devices are also only suitable for direct process observation by a technician, i.e. they do not allow for any electronic image analysis for process control.

A proven device for analyzing observed process data is known, e.g., from U.S. Pat. No. 6,570,647, and comprises at least one electro-optical probe that has an optical sensor head that can be attached to the reactor, an optical waveguide, and an opto-electronic sensor, the electrical signals of which are sent to a computer controlled evaluation unit.

This device allows for different measurements to be carried out simultaneously, and can be used for off-line or on-line analysis.

Endoscopic or videoscopic devices are also known, such as those described in DE 198,28,688, with which the processes in the interior of the process reactors are monitored and can be controlled at intervals or continuously, in real-time. These devices have an electro-optical endoscope and potentially other non-optical sensors, the signals of which are sent to an analysis and control device. These endoscopic or videoscopic devices are also referred to as "process-scopes" below.

It is clear to the person skilled in the art that these known process-scopes are not directly suitable for use in environments that may be subject to explosions. There are comprehensive explosion protection provisions for these environments, as shall be explained in greater detail below.

Explosion protection is a field of safety engineering and is used to prevent damage to people and property caused by technological or chemical products, facilities, and other equipment. The primary purpose thereof is to prevent explosions such as those triggered by combustion on hot surfaces (e.g. caused by hot electronic components), sparks (e.g. caused by static electricity), short-wave radiation and bright light (e.g. from the energy absorption thereof), or other ignition sources, which may lead to bursting or cracking of pressure vessels through unacceptable compression waves.

An effective explosion protection, also referred to as ex-protection below, is legally required in various industrial fields, e.g. in mines (atmospheric explosions, methane or coal dust ignition), in power stations (boilers), in the chemical industry (chemical reactors), in the petrochemical industry, i.e. the oil and gas industries (pipelines, storage tanks, gas tanks), as well as in processing industries (flour dust explosions in mills or granaries) or in the timber processing industry.

For this reason, there are numerous specifications, standards (e.g. IEC or EN) and legal provisions, e.g. the European Union ATEX guidelines, or the National Electrical Code (NEC) in the USA. In particular, facilities that are subject to explosions are classified into generally acknowledged zones corresponding to their hazard potential:

Zone 0/20: areas with the highest hazard level (i.e. where heats can exceed the flash point);

Zone 1/21: areas with a higher hazard level (i.e. with potential heat above the flash point, wherein the probability of an explosion is reduced through appropriate monitoring devices);

Zone 2/22: areas with lower explosion probability;

Zone NH: areas without any particular risk of explosion (non-hazardous).

The devices and apparatuses used in these zones must satisfy special requirements. By way of example, devices with operational ignition sources cannot be used in Zone 2/22. With devices with ignition hazards that are to be used in Zone 1/21, the effectiveness of the ignition prevention must not be compromised, even in the event of a malfunction. In Zone 0/20, even very improbable operating situations, which could result in an ignition source, must be accounted for in the construction of the devices. In particular, these devices must be adapted to special uses, e.g. with a pressure-tight and/or flameproof encapsulation or with a special, separate safety element for the power supply to the device (e.g. a casting compound), for self-generated light (e.g. with a cold light source), or with measures for limiting the device temperature (e.g. through heat conductors), in particular to keep the surface temperature below the ignition temperature. NH (non-hazardous) refers to zones in which there is no potential for explosion.

Devices for inspecting and observing explosion-proof reaction vessels, in particular chemical reactors in the chemical industry, have been known for some time. By way of example, a device for continuous inspection of a container for industrial production in explosion-protected areas is described in DE 10,2013,020,896. This device has an explosion-proof housing (for an ultrasonic wave transformer and corresponding transmission and receiving electronics) with ex-proof cable guides and can therefore be used in ex-protected areas. Unfortunately, this device is only suitable for examining substances, i.e. checking for tears and corrosion. Process-specific parameters cannot be observed therewith, i.e. this system does not allow for observation of the chemical process during the process.

Optical inspection devices are widespread these days, in particular with an ex-proof video-endoscope housing, with which just one camera head module is inserted into the 0 or 1 Hazard Zones, as described, e.g., in US 2007/0177010, while an associated parent device with a power supply can remain in the 2 or NH Zones. This endoscope is also only suitable for damage and corrosion inspection of open, i.e. shut down, machines, chemical reaction vessels, or turbines. These types of devices likewise do not allow for any observations or analyses and control of a production process during the process.

The object of the present invention is to create a process-scope, i.e. a device for observing and monitoring chemical and physical processes in the interiors of containers or reactors in explosion-protected areas, in particular in industrial facilities, which allow for observation and monitoring for intermittent or continuous control of a production process during operation, i.e. in-line or in situ, without interrupting the production process.

This object is achieved according to the invention with a device according to claim 1, and in particular with a videoscope (process-scope) outside the zones, which is suitable for use in explosion-protected areas, in particular in industrial production facilities. The process-scope according to the invention comprises modules in the different zones, and has a housing (protective housing) that can be used in the Hazard Zones 1/21 or 2/22, i.e. a housing without an ignition source and that is explosion-proof, as well as an observation lens barrel that can be used in the Hazard Zones 0/20 or 1/21, i.e. a lens barrel without an ignition source and that is explosion-proof, with a robust lens barrel tip. Optical cables or rod-shaped optical fibers are provided for light transmission from the lighting device to the lens barrel tip, as well as for image transmission from the lens barrel tip to the electro-optical camera. Typically, there is a single-mode or multi-mode fiber optic data cable of up to ca. 500 m for data transfer of the preferably uncompressed image data from the electro-optical camera to the data acquisition, data analysis, and data recording system.

In a preferred embodiment, the lens barrel tip has at least one front observation window and at least one front lighting window, wherein the respective front windows are adjacent to one another. In another embodiment, the lens barrel tip has a central front observation window, and a concentric front lighting window. In another embodiment, there is at least one front observation window and/or at least one front lighting window in a bi-planar element, or an element in the form of a cylinder segment or truncated cone.

It is clear that these front windows could have cleaning units (not shown), in particular a unit with which a gaseous or liquid film can be generated that flows over the outer surface of at least one of the front windows, in order to prevent reaction materials from depositing on these front windows.

In a preferred embodiment of the present invention, the lens barrel tip has a pressure-tight double barrier. This double barrier comprises a distal first sealing barrier, and a proximal second sealing barrier, wherein there is at least one first seal in the first sealing barrier between each of the mating surfaces of the lens barrel components, which fit precisely to one another, and in the second sealing barrier there is at least one second seal between each of the mating surfaces of the lens barrel components that fit precisely to one another. This double barrier is pressure-tight for a process pressure of at least 100 bar, and exhibits heat resistance up to ca. 350° C.

In a further development of the lens barrel tip according to the invention, the front lighting and/or observation windows have internal or external optical elements, in particular a prism and/or a bevel, and/or a shutter, and/or a lens, and are configured for measuring distances, e.g. parallactic distance measurement.

Furthermore, in this development the lateral front window is secured in the lens barrel tip with a retaining plate. To minimize the adhesion of particles from the particle flow and keep the light and image cone as clear as possible, the lens barrel tip around which the particles flow has an outer contour, in particular a diamond-like, horse-shoe shaped, or other flow-optimized contour, that reduces the abrasion generated by the particle flow on the outer surface of the lens barrel tip. Furthermore, the interior of the lens barrel tip can be filled with a flowing, in particular granulated, material.

According to the invention, the housing contains a lighting device, an electronic control circuit, and an electro-optical or spectroscopic camera. Furthermore, this housing is preferably coupled to a magnetomotive force device in order to prevent ignitions that generate explosions. This magnetomotive force device makes it possible for a heat-dissipating purge gas (in particular air) to flow through the housing, and to pressurize the interior thereof, e.g. in that more gas is introduced into the housing than is discharged. The housing, advantageously made of anodized aluminum is connected to the electro-optical camera and the lighting device, normally having a light source of 10 W, for heat dissipation.

In a special embodiment, the magnetomotive force device comprises a purge gas supply unit, which is connected to the housing via a supply line. This supply unit comprise a pressure regulator and a regulating stop valve controlled by an electronic control unit. This control unit is also preferably located in the housing. The purge gas supply line is attached to a first port in the housing, and the purge gas discharge is attached to a second port in the housing.

It is clear that the first and second ports, as well as the components inside the housing, in particular the lighting device, the electronic control circuit, the electro-optical or spectroscopic camera, the electronic control unit, and any additional webs and fins, are arranged such that they form a complex hollow body with the housing through the entirety of which a medium can flow. This hollow body allows for a quick and complete purge gas exchange with high convection (heat conductance). The intended arrangement of the individual components enables the generation of a flow-optimized flow rate, i.e. a laminar volume flow.

In a preferred embodiment, the first and second ports are substantially diagonal to one another.

According to the invention, the electronic control unit in the housing is connected to an external power supply via a first ex-proof cable guide for an electrical cable, and the electro-optical or spectroscopic camera is connected to an external data acquisition, data analysis, and data recording system via a second cable guide for a data cable. The external power supply and the external data acquisition, data analysis, and data recording system normally do not fulfill any special requirements regarding explosion prevention, i.e. they can only be used in NH Hazard Zones, and are also located therein. For the device according to the invention, the power supply has a safety device, however, which ensures that the power for the light that is to be generated is limited, in order to prevent excessive light intensities.

Further special embodiments and developments of the process-scope according to the invention have the features given in the dependent claims.

The process-scope according to the invention allows, for the first time, for an in-line or in situ observation during the process, in order to control processes in explosion-protected areas, e.g. in industrial reactor vessels for the chemical and petrochemical industries, in particular in a multi-zone reactor (multi-zone reactor) and at extremely high pressures, such as are used for the production of polymer particles made of polypropylene (PP) or polyethylene (PE), and described, e.g., in U.S. Pat. No. 5,698,642, or in particular in reactors operating at extremely high temperatures, such as are used for combusting solid fuels in power plants.

In a multi-zone reactor, the plastic particles can be observed in-line or in situ during the polymerization in the individual polymerization zones, and the results can be used for optimizing the process. This electro-optical device can be used in particular for the image analysis accompanying the process, e.g. to determine the current particle parameters, e.g. direction of movement, speed, surface properties, size, shape, as well as the fill level of the polymer particles in the reactor vessel, and/or to optimize the current production process.

In the following, the expression "distally located" refers to the region of the lens barrel tip, independently of the spatial position and arrangement of the respective elements in this region.

The terms "in-line" and "in situ" indicate that the observation does not take place off-line or on-line, but instead, the observation takes place directly in the process, without taking samples.

The term "free of an ignition source" comprises all means with which the light sources, in particular LEDs and their power sources, are designed and controlled such, that even in the event of a power failure (e.g. short circuit and emission peaks), the guideline values in accordance with explosion prevention requirements for device components are kept within the ranges of Zones 0/20 or 1/21.

The present invention shall be explained in greater detail below based on an exemplary embodiment, and with reference to the drawings.

Figure 2:
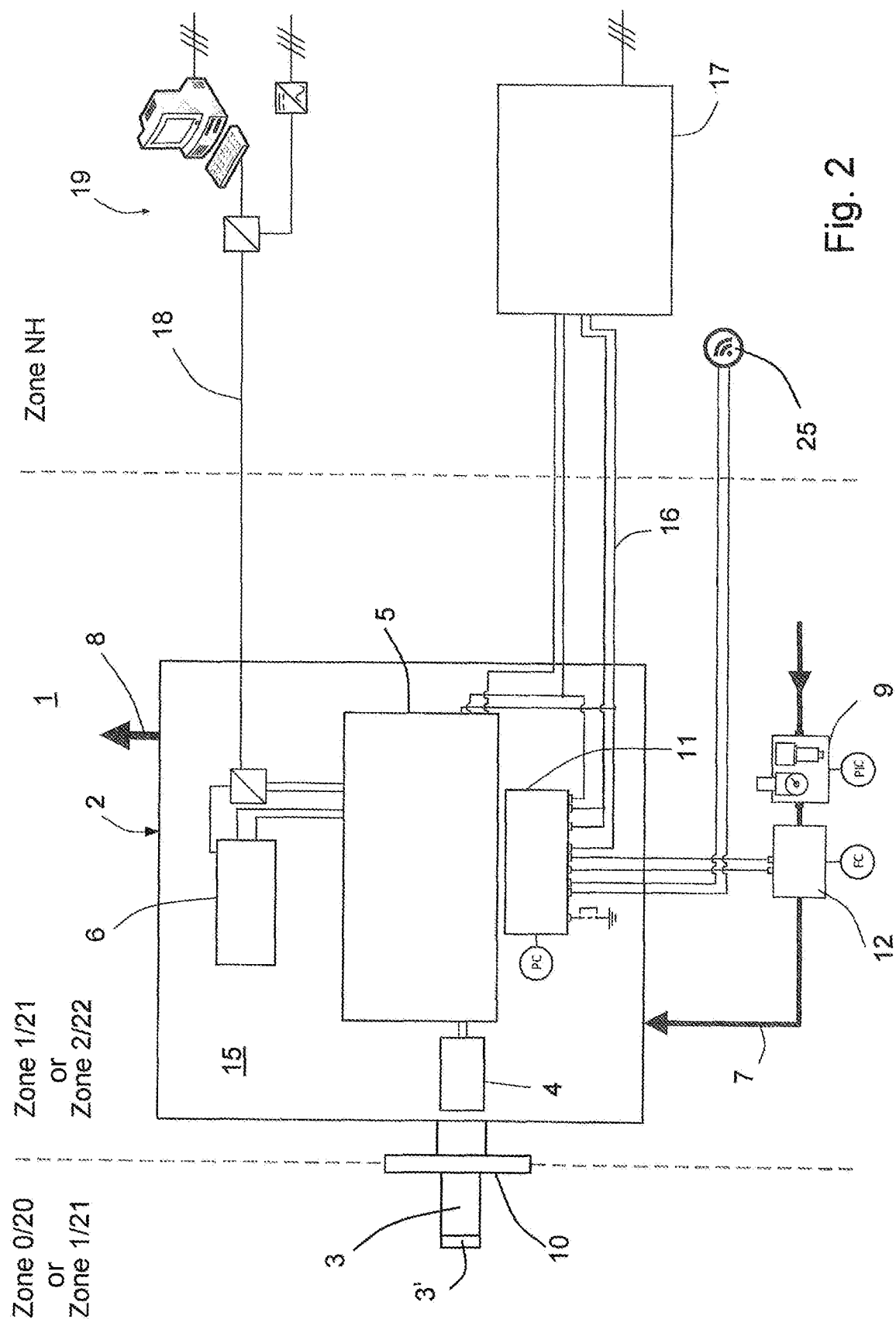
Figure 3:
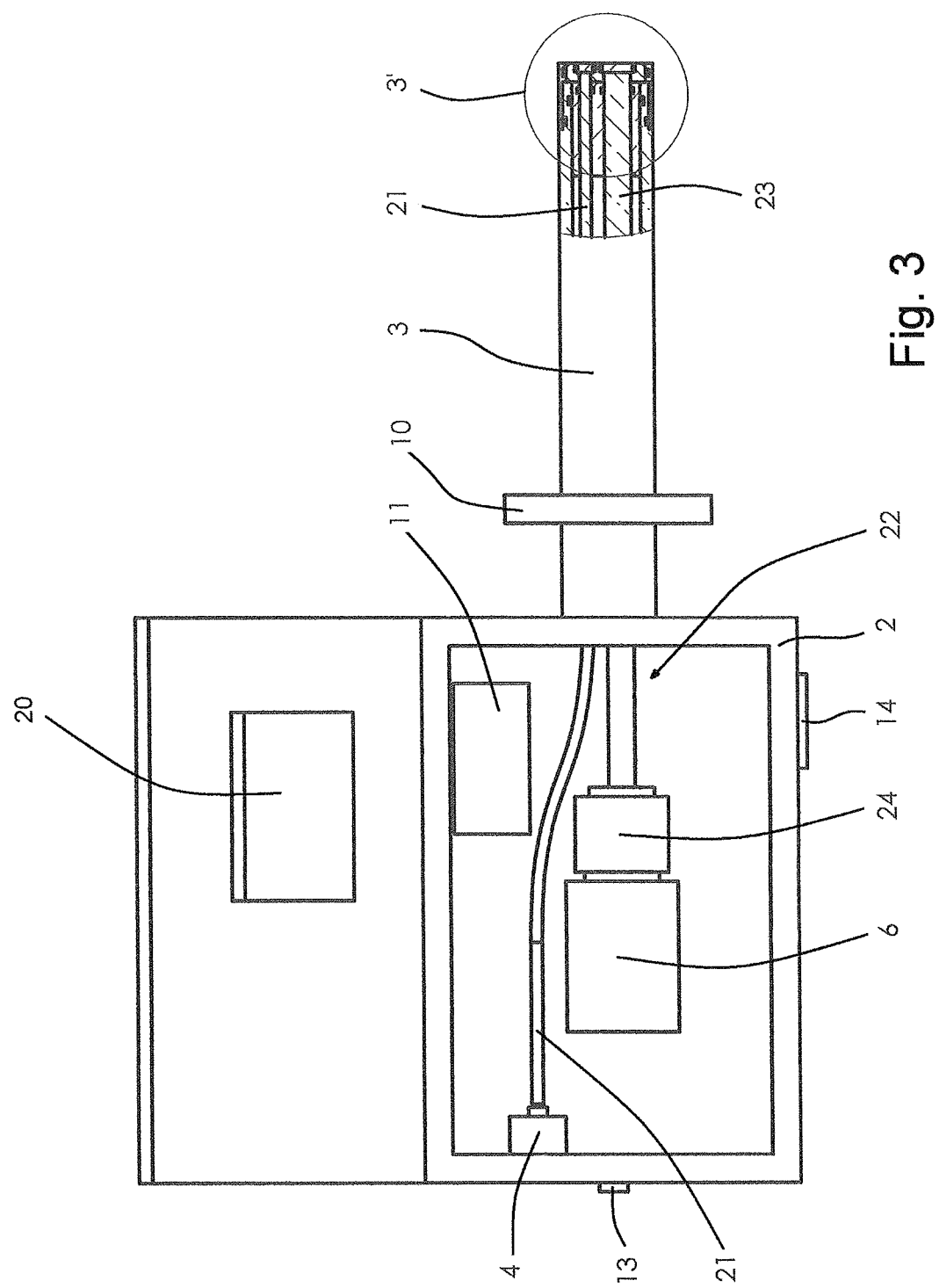
Figure 4:
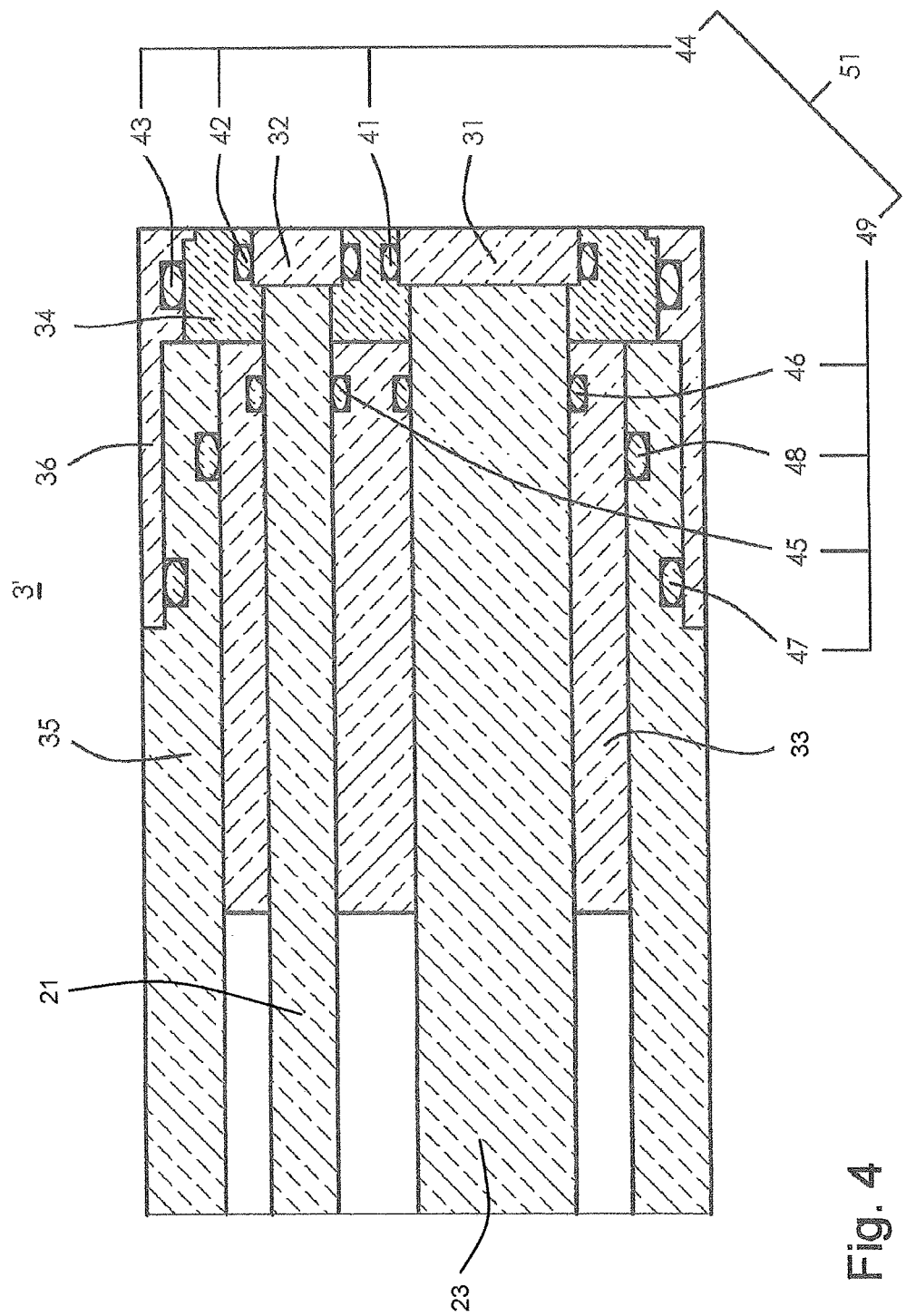
Figure 6:
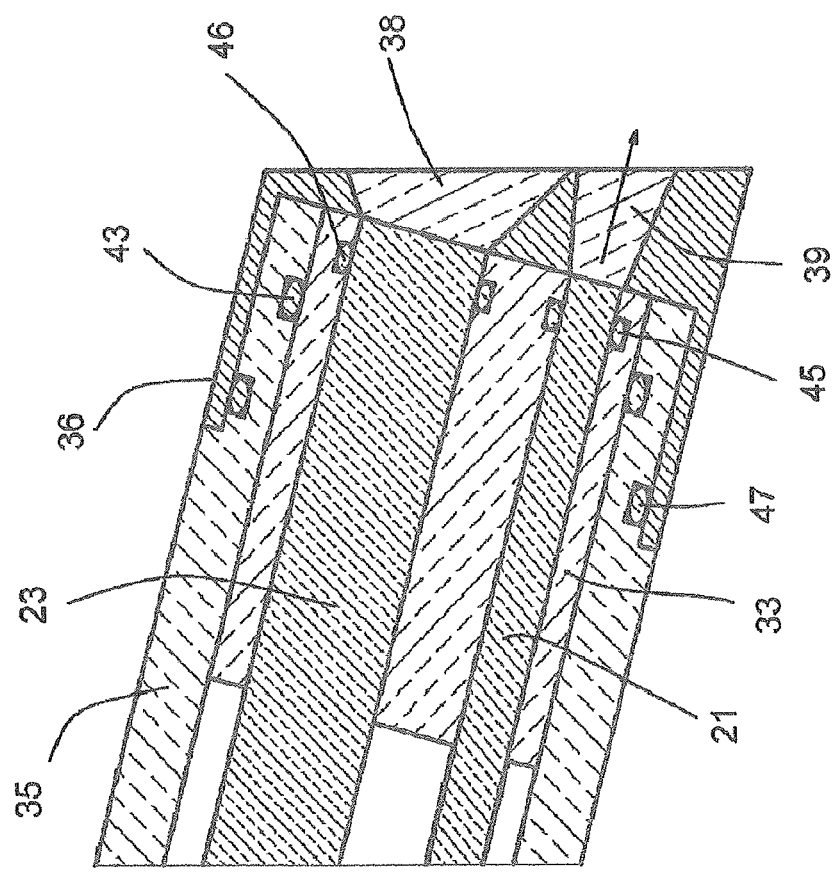
Figure 5:
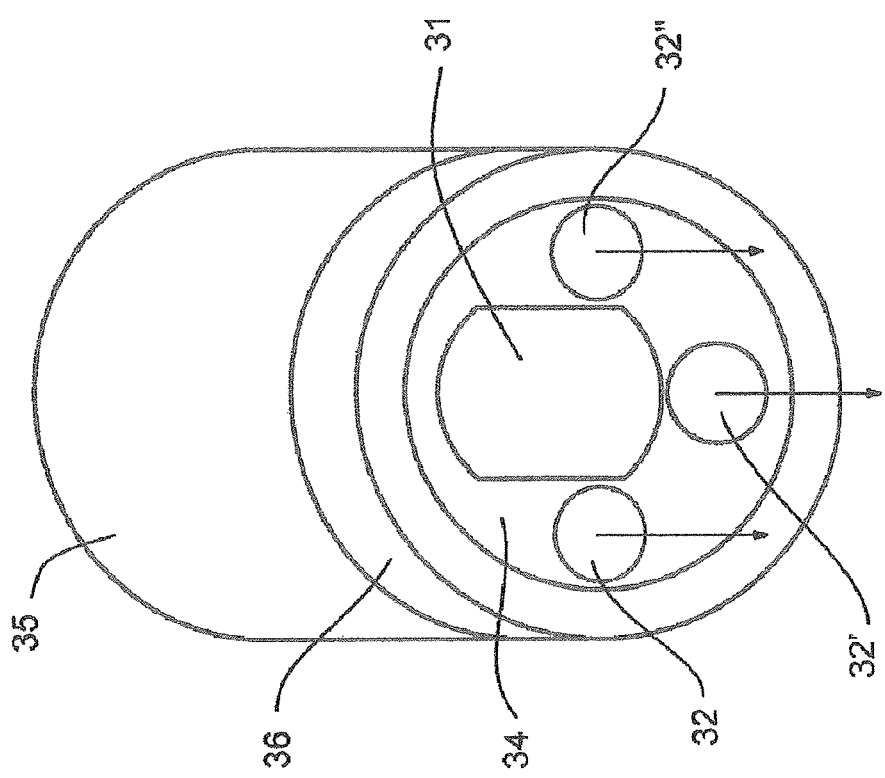
Figure 11:
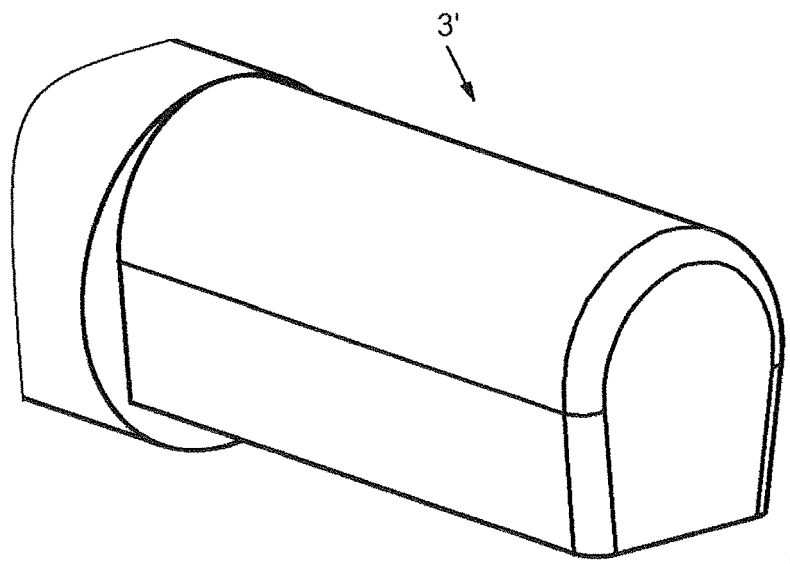
Figure 10:
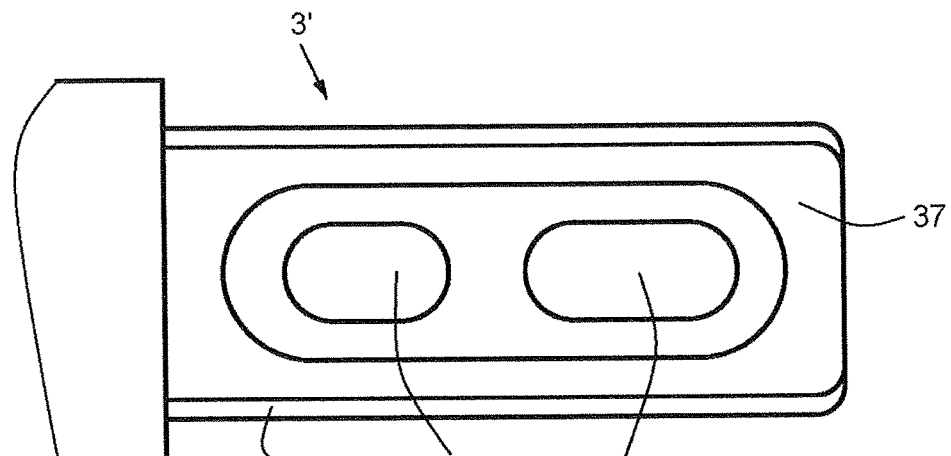
Figure 9:
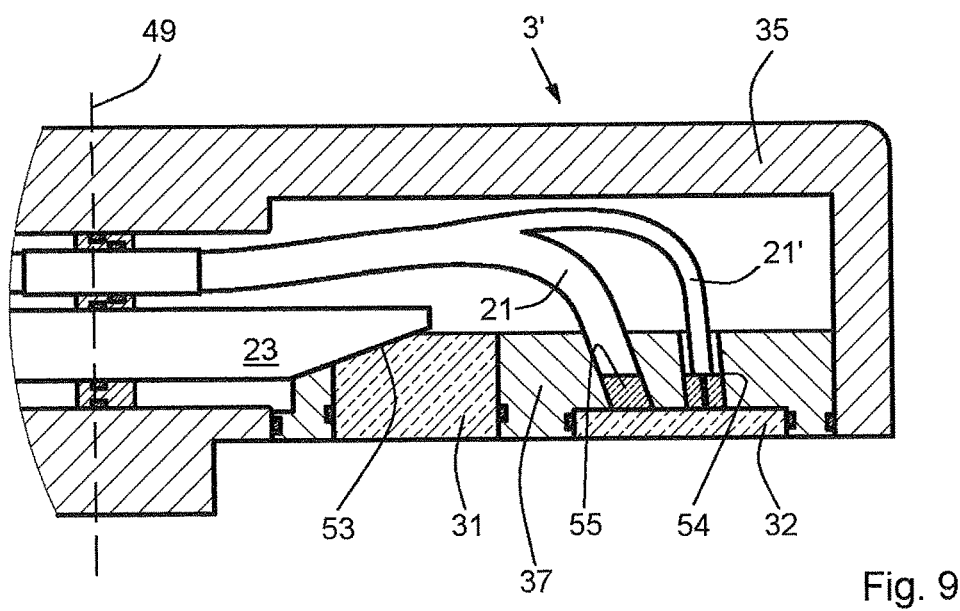
Figure 12:
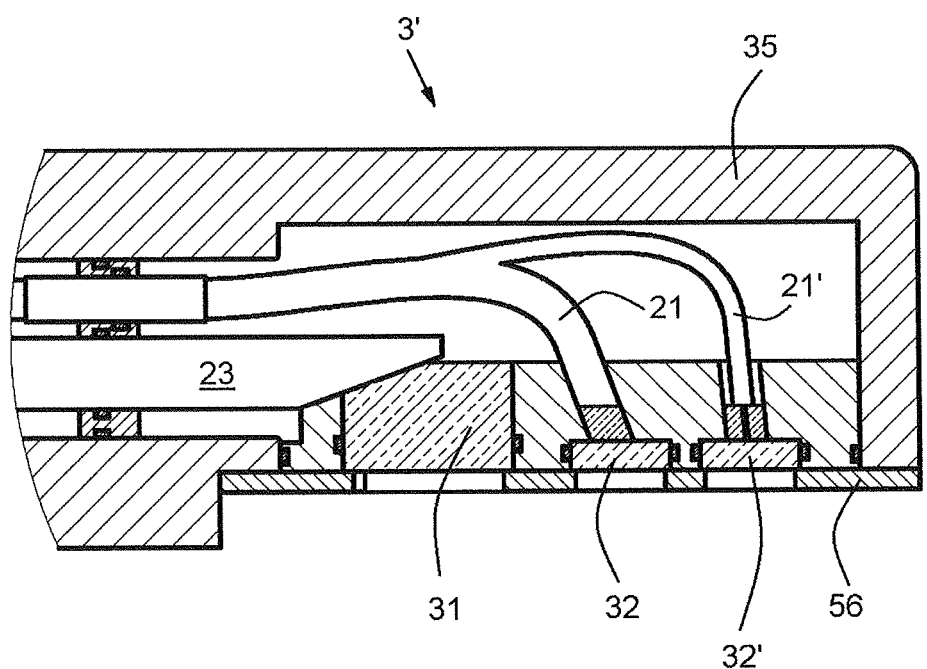

Therein:

FIG. 1: shows a schematic spatial illustration of a process-scope according to the invention;

FIG. 2: shows a schematic illustration of the electronic circuitry for the process-scope according to the invention;

FIG. 3: shows a schematic top view of an open housing according to the invention;

FIG. 4: shows a schematic longitudinal section through a first embodiment of a lens barrel tip according to the invention, which has at least one optical fiber for lighting;

FIG. 5: shows a schematic front view of a lens barrel tip according to the invention, with three front lighting windows and one front observation window;

FIG. 6: shows a schematic longitudinal section through a lens barrel tip according to the invention that has at least one optical fiber for lighting and asymmetrical front windows;

FIG. 7: shows a schematic longitudinal section through a second embodiment of a lens barrel tip according to the invention that has an annular optical fiber for lighting;

FIG. 8: shows a schematic longitudinal section through another embodiment of a lens barrel tip according to the invention that has an annular optical fiber for lighting and asymmetrical front windows;

FIG. 9: shows a schematic longitudinal section through a preferred embodiment of a lens barrel tip according to the invention that has lateral front windows;

FIG. 10: shows a schematic view from below of the embodiment shown in FIG. 9;

FIG. 11: shows a schematic illustration of a spatial view of the embodiment shown in FIG. 9;

FIG. 12: shows a schematic longitudinal section through the embodiment shown in FIG. 9, with an additional retaining plate.

The schematic spatial illustration in FIG. 1 illustrates the arrangement of the individual modules in the process-scope 1 according to the invention. In particular, the observation lens barrel 3 extends with its lens barrel tip 3' into the area with the highest hazard level, i.e. Zone 0/20, or Zone 1/21. It has proven to substantial to the invention that the lens barrel tip 3' and the observation lens barrel 3 contain no active components. The protective housing 2 has a mount 10 for fixation on a container or reactor, in particular to ensure a secure connection thereto. A controller display 20 allows for a metering of device-specific data, such as temperature, internal pressure, etc. The housing satisfies the IEC/EN conditions for housings in Zones 1/21 or 2/22, i.e. it has a so-called pressurized "ex-p" magnetomotive force device 7, 8, 9, 12, 5 in accordance with these guidelines inside the housing, for flushing this housing 2 with a purge gas, in particular air, and to pressurize it with an internal pressure of ca. 5 to 20 mbar, preferably ca. 10 mbar. For this, the housing is connected to a purge gas supply line 7 and a purge gas discharge 8. The purge gas is supplied from the NH Zone, and regulated in the 1/21 or 2/22 Zones using a pressure regulator 9 and regulating stop valve 12 controlled by an electronic control unit 11. The power supply is ensured via a power cable 16. A data cable 18 of, e.g., 300 m to 500 m, connects the camera data to a data acquisition, data analysis, and data recording system 19 located in the NH Zone. An alarm 25 in the NH Zone enables monitoring of the electronic control unit 11 in the protective housing. It is clear that the data acquisition, data analysis, and data recording system 19 comprises at least one analysis module in a further development, with which necessary parameters for the control and regulation for optimizing the specified processes can be determined and measured, in order to use the device as a video-based unit for realtime measurements during the process, to optimize the control and regulation of desired parameters. These desired and/or necessary parameters, determined through corresponding image analysis modules, which are necessary for optimizing control and regulation, e.g. with multi-phase processors, are, e.g.:
  the speeds of solids, bubbles and droplets;
  the size distributions of solid particles, bubbles, and droplets (e.g. particle size distribution (PSD) of solid particles in gas);
  parameters that characterize the morphologies of solid particles (broken particle count, shape factors as, e.g., roundness, aspect ratio, convexity, etc.)
  parameters that characterize the current process conditions (e.g. bulk/not bulk conditions);
  threshold values for triggering alarms in unfavorable process conditions (e.g. junk alarm);
  parameters for measuring distances (e.g. surface heights of a filling);
  other parameters determined through image data, and significant for controlling and regulating the processes.

FIG. 2 shows a schematic illustration of the electronic circuitry for the process-scope 1 according to the invention, and its spatial location in the special hazard zones. It is clear that there are only passive components in Zone 0/20 (or Zone 1/21). I.e., only the observation lens barrel 3 extends into this region with its lens barrel tip 3'. The rest of the protective housing 2 is attached with a robust and reliable retainer 10 to the container or reactor (not shown) that is to be observed. There is a lighting device 4, an electro-optical or spectroscopic camera 6, an electronic safety circuit 5 for the lighting device 4, and an electronic control unit 11 for controlling the purge gas flow and the internal pressure generated by it, in the housing interior 15. The power supply unit 17, data acquisition, data analysis, and data recording system, and an alarm 25, are located in the non-hazardous NH Zone.

The schematic top view shown in FIG. 3 of an open housing 2 according to the invention illustrates the arrangement of the electronic modules. An optical fiber, in particular an optical fiber for lighting 21 conducts the light from the lighting device 4 into the observation lens barrel 3 to the lens barrel tip 3'. An optical fiber, in particular an optical fiber for image transmission 23, e.g. with a rod lens or a fiber bundle, conducts the image data via a lens 24 from the lens barrel tip 3' back to the electro-optical camera 6 in an endoscope 22. The lighting device 4 and the electronic control unit 11 are preferably arranged in the housing interior 15 such that they are continuously surrounded by a purge gas, which flows from a first port 13 to a second port 14. Furthermore, the control unit 11 shuts off all of the electronic components, such that they do not receive electricity, when the excess pressure in the interior of the housing collapses, e.g. when the housing is opened. The controller display 20 is located in the lid for the protective housing 2, and indicates, among other things, the temperature (typically −15° C. to 50° C.), the relative humidity, and the internal pressure.

The retainer 10 enables a robust attachment of the process-scope 1 to a container or reactor. The protective housing 2 is advantageously made of anodized aluminum, while the observation lens barrel 3 has a lens barrel shell 35 made of stainless steel.

FIG. 4 shows a schematic longitudinal section through a first embodiment of a lens barrel tip 3' according to the invention that has at least one optical fiber for lighting 21. According to the invention, the lens barrel tip 3' has a pressure-resistant double barrier 51. This double barrier 51 comprises a distal, first sealing barrier 44 and a proximal, second sealing barrier 49, wherein there is at least one first front seal 43, a front lighting window seal 42, and a front observation window seal 41 between each of the mating surfaces of the lens barrel components, which fit precisely to one another, in particular between the lens barrel cap 36 and a front window mount 34, and between a front lighting window 31 and the front window mount 34, and between a front observation window 31 and the front window mount 34, and for the second sealing barrier 49 there is at least one second lens barrel cap seal 48, one lens barrel shell seal 47, one seal for the optical fiber for lighting 46 and one seal for the optical fiber for image transmission 45 between each of the mating surfaces of the lens barrel components, which fit precisely to one another, in particular between the lens barrel cap 36 and a lens barrel shell 35, and between the lens barrel shell 35 and the socket for the optical fiber for image transmission 33, and between the socket for the optical fiber for image transmission 33 and the optical fiber for lighting 21. This double barrier is pressure-tight for a process pressure of at least 100 bar. The lens barrel tip 3' has a heat resistance of up to ca. 350° C., if the lens barrel is not cooled. It is clear that this temperature resistance can be increased by an appropriate cooling of the lens barrel tip 3'.

In a further development of the lens barrel tip 3' according to the invention, there are additional optical fibers for lighting. The schematic front view of a lens barrel tip 3' with numerous optical fibers for lighting shown in FIG. 5 shows the front lighting window 32, a second lighting window 32' and a third lighting window 32", as well as a maximized front observation window 31. These windows are retained in a front window mount 34, which is connected to the lens barrel shell 35 via a lens barrel cap 36.

The schematic longitudinal section through a lens barrel tip 3' according to the invention that has at least one optical fiber for lighting shown in FIG. 6, shows a front lighting window 39 in the form of an asymmetrical truncated cone and a front observation window 38 in the form of an asymmetrical truncated cone. This asymmetrical embodiment allows for a non-orthogonal attachment of the lens barrel tip 3' to a container or reactor, and results in another perspective into the interior of the container or reactor. It is clear that there can also be numerous asymmetrical lighting windows with this embodiment. The sealing elements shown in FIG. 6 correspond to those in FIG. 4 and satisfy the requirements for a first sealing barrier 44. The person skilled in the art would be able to create a second sealing barrier 49, based on his knowledge of the embodiment described above, in order to obtain the double barrier 51.

The schematic longitudinal section through a second embodiment of a lens barrel tip 3' according to the invention shown in FIG. 7 shows a central optical fiber for image transmission 23 that has a concentric annular optical fiber for lighting 21". Furthermore, the associated front windows 31 and 32' have conical lateral surfaces, in particular for preventing reflections and emission losses at the lateral walls. A particularly suitable material for use as the front windows for the process-scope according to the invention has proven to be sapphire crystals.

The schematic longitudinal section through another embodiment of a lens barrel 3' according to the invention shown in FIG. 8 shows an asymmetrical, truncated conical front observation window 38 and an annular front lighting window 39 with an asymmetrical, truncated cone lateral surface. The associated optical fiber for lighting 21" can be formed by an annular optical fiber bundle. These embodiments enable an observation and detection perspective at an angle to the lens barrel axis, in particular for distance measurement.

The longitudinal section shown in FIG. 9 clearly illustrates that the front windows 31, 32 can also be placed laterally in the barrel lens tip 3', in particular when the field of vision is to be directed toward the lower region of the container, as would advantageously be considered for a parallactic distance measurement to determine the fill level. A first optical light wave guide 21 is preferably coupled via a lens system 55 to the front lighting window 32, in order to be able to illuminate the largest possible area (width, depth). Furthermore, an additional optical fiber for lighting 21' is coupled to a projection lens 55 for the structured or patterned projection light (structured light) necessary for a parallactic measurement, for projecting a grid or line pattern, as is known, e.g., from reticle plates in optical measurement and sighting mechanisms, or in the simplest case, in the form of a 2-part light/dark field. The optical fiber for image transmission 23 is coupled to a bevel 53 on the front observation window 31, and can substantially record at least the lighted image field. In this embodiment, the first sealing barrier 44 is placed laterally between the optical elements 31, 32 in the lens barrel tip 3', and the second sealing barrier 49 lies behind it.

It is clear that the interior of the lens barrel tip 3' can be filled with a filler material, in particular a nonwoven or granulated material, in particular to also minimize the danger of an explosion.

FIG. 10 shows a view from below of the embodiment of the lens barrel tip 3' shown in FIG. 9, and illustrates the positions of the two front windows 31, 32 retained in the base 37 of the lens barrel shell 35, the geometrical offset of which is substantial to the parallactic distance measurement.

The illustration shown in FIG. 11 shows the embodiment illustrated in FIGS. 9 and 10, i.e. an embodiment in which the lens barrel tip 3' extends into the reaction vessel, such that it is exposed to the particle flow therein. In order to reduce the associated abrasion and adhesion of particles, the outer contour of the lens barrel tip 3' can be designed such that it has a flow-optimized or sleeve-like cross section, in particular a diamond shaped cross section. It is clear that the person skilled in the art can take other measures that counteract the position-dependent abrasion, in particular by attaching deflectors or with liquid counter-flows that deflect particles. It is clear that the light and image cones for, e.g., parallactic measurement of particles can be kept clear of particles with these means, thus improving the image quality.

The longitudinal section through the embodiment shown in FIG. 9, schematically shown in FIG. 12, has an additional retaining plate 56. Material adhesions, which would reduce the resolution and precision of the measurement results in, e.g., a parallactic distance measurement, should be prevented with this retaining plate 56, which can be made of any antistatic material, in particular a metallic or transparent material, with or without openings. The embodiment shown here comprises separate front windows 32, 32' for each of the optical fibers for lighting 21, 21', simplifying the coupling thereof to the projection lens 54 or lens system.

It is clear that the observation lens barrel and/or its lens barrel tip can be attached in a stationary or movable manner to the container or reactor, and in particular, can extend into the interior of the container. In particular, prismatic elements can be placed on the outer surface of the lens barrel tip, for deflecting the lighting field, or field of vision, into the lower portion of the container, for example. Furthermore, the individual modules and components in the interior of the protective housing can be designed such that they have no ignition sources. In particular, the electronic control circuits can be grouted, or the camera can also be encapsulated. This camera can be controlled with a remote control, and have an imaging rate of up to 1,000 fps, or an image resolution in the range of, e.g. a few MP. A bending radius of less than 6 to 10 cm is advantageously maintained for the optical fibers for image transmission. The light source can also be coupled to cooling fins and special means for bundling the light (preferably from an LED) into the optical fiber for lighting, or the optical fiber bundle for lighting. The light emission at the lens barrel tip typically exhibits emissions of ca. 600 mW for continuous light, or 20 $mW/mm^2$, thus ca. 200 lm. The protective housing is configured in a preferred embodiment for an excess pressure of 5 to 20 mbar, preferably 20 mbar, and made of a heat conducting metal, in particular anodized aluminum. The lens barrel tip withstands process temperatures of, e.g., −50° C. to 100° C., or 150° C. when it is not cooled, and temperatures of up to 1,500° C. when it is cooled with a cooling shell, and withstands a process pressure of, e.g., up to 42 bar or 65 bar, respectively. The observation lens barrel can be rigid or flexible, and can be numerous meters long. The present process-scope can, of course, be equipped with different electro-optical cameras, in particular with different frame rates, resolutions, monochrome or color resolutions, etc. It is also clear that the optical properties, such as focus, enlargement, or light intensity, can be adjusted remotely. In the same manner, instead of a continuous light, a pulsed light can be used for the observation, which is coordinated to the camera's imaging sequence.

The advantages of the present process-scope are immediately clear to the person skilled in the art, in particular regarding its robustness, its simple handling, and its high-resolution image processing. In particular, this process-scope has proven to be reliable and resistant to environmental effects, vibration resistant, corrosion resistant, resistant to chemicals, able to withstand strong rain, moisture-tight, salt-spray resistant, able to withstand ice/freezing rain, explosion-proof, abrasion resistant, sand and dust resistant, exhibits high optical and mechanical reliability, prevents ingress of foreign bodies because of the sealed mechanical connecting points and the protected supply and discharge ports, deflects electromagnetic disruptions, and can be used anywhere. In particular, the process-scope according to the invention enables inspection of containers or reactors in nuclear engineering and pharmaceutical facilities or in the petrochemical or oil industries.

REFERENCE SYMBOLS 1 process-scope
2 protective housing
3 observation lens barrel
3' lens barrel tip
4 lighting device
5 electronic safety circuit
6 electro-optical or spectroscopic camera
7 purge gas supply line
8 purge gas discharge, pressure valve
9 pressure regulator
10 mount for fixation on a container or reactor
11 electronic control unit
12 regulating stop valve
13 first port
14 second port
15 housing interior
16 power cable
17 power supply unit
18 data cable
19 data acquisition, data analysis, and data recording system
20 controller display
21 optical fiber for lighting
21' additional optical fiber for lighting
21" annular optical fiber for lighting
22 endoscope
23 optical fiber for image transmission
24 lens
25 alarm
31 front observation window
32 front lighting window
32' second front lighting window
32" third front lighting window
32'" annular front lighting window
33 socket for optical fibers
34 front window mount
35 lens barrel shell
36 lens barrel cap
37 lens barrel shell base
38 asymmetrical front observation window
39 asymmetrical front lighting window
41 front observation window seal
42 front lighting window seal
43 front seal
44 first sealing barrier
45 seal for optical fiber for image transmission
46 seal for optical fiber for lighting
47 lens barrel shell seal
48 lens barrel cap seal
49 second sealing barrier 51 double barrier
53 bevel
54 projection lens
55 lens system
56 retaining plate
57 lens barrel interior

The invention claimed is:

1. A process-scope, for observing, monitoring, controlling and regulating chemical and physical processes in the interiors of explosion-proof reaction vessels, in particular in industrial facilities and during the operation thereof, i.e. without interruption of the production and/or research and development processes, wherein the process-scope comprises an observation lens barrel with a lens barrel tip, and electro-optical or spectroscopic camera, a housing with an electronic safety circuit and a lighting device, as well as a power supply unit and a data acquisition, data analysis, and data recording system with image processing electronics, wherein the process-scope comprises modules separated into different zones such that the lens barrel tip and the observation lens barrel have no electronic components and by that do not comprise any ignition sources and are suitable for use in an explosion-protected area, in particular Hazard Zones 0/20 and 1/21 in an explosion-protected area according to IEC standards, wherein the housing is suitable for use in an explosion-protected area, in particular Hazard Zone 1/21 and/or Hazard Zone 2/22 of an explosion-protected area according to IEC standards, wherein the power supply unit and the data acquisition, data analysis, and data recording system is suitable for use in an explosion-protected area, in particular in the NH Hazard Zone of an explosion-protected area, wherein optical fibers, in particular fiber-optic cables transmit light from the lighting device to the lens barrel tip and transmit images from the lens barrel tip to the electro-optical camera or spectroscopic camera, and a single-mode or multi-mode fiber optic data cable transmits the image data from the electro-optical camera to the data acquisition, data analysis, and data recording system.

2. The process scope according to claim 1, wherein the lens barrel tip has a cooling means.

3. The process scope according to claim 2, wherein the cooling means are in the form of a water-cooled cooling shell.

4. The process scope according to claim 1, wherein the data acquisition, data analysis, and data recording system comprises at least one analysis module, with which parameters necessary for controlling, regulating and optimizing the specified processes can be determined and measured in order to use the device as a video-based measurement unit for realtime measurements of parameters necessary for the control and optimization during the process.

5. The process scope according to claim 4, wherein the analysis module comprises numerous and/or different electro-optical and/or spectroscopic cameras with different recording functions, such as the imaging rate (frame rate), monochrome or polychrome image resolution with different brightness and/or color resolutions, and/or with different optical properties such as focus, enlargement, or light intensity, and/or with different image processing electronics.

6. The process scope according to claim 5, wherein these cameras can be adjusted remotely.

7. The process scope according to claim 6, wherein these cameras can be adjusted remotely with respect to focus and zoom.

8. A method of in-line or in situ observation, monitoring, control, and regulation of chemical and physical processes in the interiors of explosion-proof reaction vessels, in particular in industrial facilities and during the operation thereof, i.e. without interruption of the production and/or research and development processes, comprising;
  inserting the tip of the process scope of claim 1 into the interiors of explosion-proof reaction vessels;
  illuminating the interiors of explosion-proof reaction vessels with the lighting device; and
  transmitting the image data from the electro-optical camera to the data acquisition, data analysis, and data recording system.

9. A process scope, for observing, monitoring, controlling and regulating chemical and physical processes in the interiors of explosion-proof reaction vessels, in particular in industrial facilities and during the operation thereof, i.e. without interruption of the production and/or research and development processes, wherein the process-scope comprises, an observation lens barrel with a lens barrel tip, and electro-optical or spectroscopic camera, a housing with an electronic safety circuit and a lighting device, as well as a power supply unit and a data acquisition, data analysis, and data recording system with image processing electronics, wherein the process-scope further comprises modules separated into different zones such that the lens barrel tip and the observation lens barrel have no electronic components and by that do not comprise any ignition sources and are suitable for use in an explosion-protected area, wherein the housing is suitable for use in an explosion-protected area, wherein the power supply unit and the data acquisition, data analysis, and data recording system is suitable for use in an explosion-protected area, wherein optical fibers, in particular fiber-optic cables transmit light from the lighting device to the lens barrel tip and transmit images from the lens barrel tip to the electro-optical camera or spectroscopic camera, and a single-mode or multi-mode fiber optic data cable transmits the image data from the electro-optical camera to the data acquisition, data analysis, and data recording system, wherein the lens barrel tip has an explosion-proof double barrier that comprises a distal first sealing barrier and a proximal second sealing barrier, wherein the first sealing barrier has at least one first seal between each of the mating surfaces of the lens barrel components in the lens barrel tip, which fit precisely to one another, and wherein there is at least one second seal between each of the mating surfaces of the lens barrel components of the lens barrel tip, which fit precisely to one another, wherein at least one first seal and at least one second seal in the double barrier are pressure-tight at a process pressure of ca. 100 bar, and have a process temperature resistance to at least 150° C.

10. The process scope according to claim 9, wherein the lens barrel tip has
  a) at least one front observation window and at least one front lighting window, which are adjacent to one another, or
  b) a central front observation window and a concentric, preferably annular, front lighting window,
  wherein
  c) at least one front observation window and/or at least one front lighting window, or a collective front lighting and observation window are formed as a bi-planar optical element or an asymmetrical truncated cone.

11. The process scope according to claim 10, wherein the at least one front lighting window and the at least one front observation window and/or the collective front lighting and observation widow, are placed at the end of, or laterally in, the lens barrel tip, and are made in particular of sapphire crystal.

12. The process scope according to claim 11, wherein the front lighting and/or observation windows have inner or outer optical elements, in particular a prism and/or bevel, and/or a shutter, and/or a lens, and are configured for measuring distances in a suitable manner.

13. The process scope according to claim 12, wherein the front windows placed laterally in the lens barrel tip are secured with a retaining plate, in particular to also minimize adhesion of particles from the particle flow.

14. The process scope according to claim 12, wherein the lens barrel tip around which the particles flow exhibits an outer contour, in particular a diamond-shaped, flow optimized, or sleeve-shaped cross section that is suitable for reducing the adhesion of particles and the abrasion generated by the particle flow on the outer surface of the barrel lens tip extending into the container.

15. The process scope according to claim 12, wherein the interior of the lens barrel tip is filled with a flowing, in particular granulated, material.

16. The process scope according to claim 10, wherein at least one of the respective front windows in the lens barrel tip has a cleaning unit, in particular with a unit with which a liquid or gaseous film that flows over the outer surface of at least one of the respective front windows can be intermittently or continuously generated.

17. The process scope according to claim 9, wherein the housing is coupled to an "ex-p" magnetomotive force device, for providing it with a purge gas, in particular air, for providing a magnetomotive force, and for providing it with an increased interior pressure of ca. 5 to 20 mbar.

18. A process scope, for observing, monitoring, controlling and regulating chemical and physical processes in the interiors of explosion-proof reaction vessels, in particular in industrial facilities and during the operation thereof, i.e. without interruption of the production and/or research and development processes, wherein the process-scope comprises, an observation lens barrel with a lens barrel tip, and electro-optical or spectroscopic camera, a housing with an electronic safety circuit and a lighting device, as well as a power supply unit and a data acquisition, data analysis, and data recording system with image processing electronics, wherein the process-scope further comprises modules separated into different zones such that the lens barrel tip and the observation lens barrel have no electronic components and by that do not comprise any ignition sources and are suitable for use in an explosion-protected area, wherein the housing is suitable for use in an explosion-protected area, wherein the power supply unit and the data acquisition, data analysis, and data recording system is suitable for use in an explosion-protected area, wherein optical fibers, in particular fiber-optic cables transmit light from the lighting device to the lens barrel tip and transmit images from the lens barrel tip to the electro-optical camera or spectroscopic camera, and a single-mode or multi-mode fiber optic data cable transmits the image data from the electro-optical camera to the data acquisition, data analysis, and data recording system, wherein the housing is coupled to an "ex-p" magnetomotive force device, for providing it with a purge gas, in particular air, for providing a magnetomotive force, and for providing it with an increased interior pressure of ca. 5 to 20 mbar, wherein the magnetomotive force device comprises a purge gas supply unit, comprises a purge gas supply line connected to the housing, and a purge gas discharge connected to the housing, as well as a pressure regulator and a regulating stop valve controlled by an electronic control unit in the housing, wherein the purge gas supply line is attached to a first port in the housing and the purge gas discharge is connected to a second port in the housing.

19. The process scope according to claim 18, wherein the first and second ports as well as a lighting device in the interior of the housing, an electronic safety circuit, at least one electro-optical or spectroscopic camera, an electronic control unit and any additional webs, fins, or deflectors are arranged such that they form a complex hollow element, through the entirety of which a medium can flow, which communicates with the interior of the lens barrel tip, which exhibits a temporally optimized (quick) and complete purge gas exchange with a high level of convection, and a flow-optimized flow-through rate (laminar volume flow).

20. The process scope according to claim 19, wherein the lens barrel tip extending into the reaction vessel comprises means for shielding it, in particular in the form of a deflector plate at the side from which the flow approaches.

* * * * *